US012490294B2

(12) United States Patent
Kang et al.

(10) Patent No.: US 12,490,294 B2
(45) Date of Patent: Dec. 2, 2025

(54) COMMUNICATION APPARATUSES AND COMMUNICATION METHODS FOR MODE 2 RESOURCE (RE-)SELECTION FOR PACKET DELAY BUDGET LIMITED SCENARIO

(71) Applicant: Panasonic Intellectual Property Corporation of America, Torrance, CA (US)

(72) Inventors: Yang Kang, Singapore (SG); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 345 days.

(21) Appl. No.: 17/800,199

(22) PCT Filed: Dec. 10, 2020

(86) PCT No.: PCT/SG2020/050735
§ 371 (c)(1),
(2) Date: Aug. 16, 2022

(87) PCT Pub. No.: WO2021/167529
PCT Pub. Date: Aug. 26, 2021

(65) Prior Publication Data
US 2023/0065878 A1 Mar. 2, 2023

(30) Foreign Application Priority Data
Feb. 21, 2020 (SG) .............................. 10202001577T

(51) Int. Cl.
*H04W 72/56* (2023.01)

(52) U.S. Cl.
CPC .................................. *H04W 72/56* (2023.01)

(58) Field of Classification Search
None
See application file for complete search history.

(56) References Cited

U.S. PATENT DOCUMENTS

2020/0029245 A1* 1/2020 Khoryaev ............. H04W 36/22
2020/0267523 A1* 8/2020 Tang .................... H04L 5/0044
(Continued)

FOREIGN PATENT DOCUMENTS

TW         202007196 A       2/2020
WO    WO-2019051782 A1 *  3/2019  ............ H04W 72/02

OTHER PUBLICATIONS

Fraunhofer HHI et al., "Resource Allocation for Mode 2 NR V2X," RI-1912289, Agenda Item: 7.2.4.2.2, 3GPP TSG RAN WGI #99, Reno, USA, Nov. 18-22, 2019, 9 pages.
(Continued)

*Primary Examiner* — Sujoy K Kundu
*Assistant Examiner* — Raul Rivas
(74) *Attorney, Agent, or Firm* — Seed Intellectual Property Law Group LLP

(57) ABSTRACT

The present disclosure provides communication apparatuses and communication methods for Mode 2 resource (re-) selection for packet delay budget limited scenario. The communication apparatuses include a communication apparatus comprising: circuitry which, in operation, adjusts a candidate resource ratio based on a time period, and identifies a plurality of resource candidates based on the adjusted candidate resource ratio; and a transmitter, which, in operation, transmits a transmission block using a resource selected from the plurality of resource candidates.

15 Claims, 12 Drawing Sheets

(56) References Cited

U.S. PATENT DOCUMENTS

2021/0136744 A1    5/2021  Lu et al.
2021/0289496 A1*   9/2021  Lee .................. H04W 74/0808
2021/0314917 A1*  10/2021  Lee ..................... H04B 7/0404

OTHER PUBLICATIONS

3GPP, "3rd Generation Partnership Project; Technical Specification Group Radio Access Network; Evolved Universal Terrestrial Radio Access (E-UTRA); Physical layer procedures (Release 16)," 3GPP TS 36.213 V16.0.0, Dec. 2019. (568 pages).

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019, 99 pages.

3GPP, "3rd Generation Partnership Project; Technical Specification Group Radio Access Network; NR; NR and NG-RAN Overall Description; Stage 2 (Release 15)," 3GPP TS 38.300 V15.7.0, Sep. 2019. (99 pages).

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Radio Access Network; Study on Scenarios and Requirements for Nest Generation Access Technologies; (Release 15)," 3GPP TR 38.913 V15.0.0, Jun. 2018. (39 pages).

3GPP, "3rd Generation Partnership Project; Technical Specification Group Services and System Aspects; Architecture enhancements for 5G System (5GS) to support Vehicle-to-Everything (V2X) services (Release 16)," 3GPP TS 23.287 V16.0.0, Sep. 2019. (49 pages).

3GPP, "3rd Generation Partnership Project; Technical Specification Group Services and System Aspects; Procedures for the 5G System; Stage 2 (Release 16)," 3GPP TS 23.502 V16.1.1, Jun. 2019. (247 pages).

International Search Report, mailed Feb. 10, 2021, for International Patent Application No. PCT/SG2020/050735. (4 pages).

International Telecommunication Union, "IMT Vision—Framework and overall objectives of the future development of IMT for 2020 and beyond," Recommendation ITU-R M.2083-0, Sep. 2015. (21 pages).

Lenovo, Motorola Mobility, "Discussion on resource allocation for NR sidelink Mode 2," R1-1912324, Agenda Item: 7.2.4.2.2, 3GPP TSG RAN WG1 #99, Reno, USA, Nov. 18-22, 2019. (5 pages).

MCC Support, "Final Report of 3GPP TSG RAN WG1 #98 v2.0.0 (Prague, Czech Rep, Aug. 26-30, 2019)," R1-1911429, 3GPP TSG RAN WG1 Meeting #98bis, Chongqing, China, Oct. 14-18, 2019. (180 pages).

MCC Support, "Final Report of 3GPP TSG RAN WG1 #98bis v2.0.0 (Chongqing, China, Oct. 14-20, 2019)," R1-1913275, 3GPP TSG RAN WG1 Meeting #99, Reno, USA, Nov. 18-22, 2019. (160 pages).

Samsung, "On Resource Allocation for NR V2X Mode 2," R1-1912460, Agenda item: 7.2.4.2.2, 3GPP TSG RAN WG1 #99, Reno, USA, Nov. 18-22, 2019. (8 pages).

Extended European Search Report dated Jun. 23, 2023, for the corresponding European Patent Application No. 20920615.0, 11 pages.

Intel Corporation, "Remaining opens of resource allocation mode-2 for NR V2X design," R1-2000731, Agenda Item: 7.2.4.2.2, 3GPP TSG RAN WG1 #100-E, e-Meeting, Feb. 24-Mar. 6, 2020, 16 pages.

Vivo "Remaining issues on mode 2 resource allocation mechanism," R1-2000317, Agenda Item: 7.2.4.2.2, 3GPP TSG RAN WG1 #100, e-Meeting, Feb. 24-Mar. 6, 2020, 7 pages.

\* cited by examiner

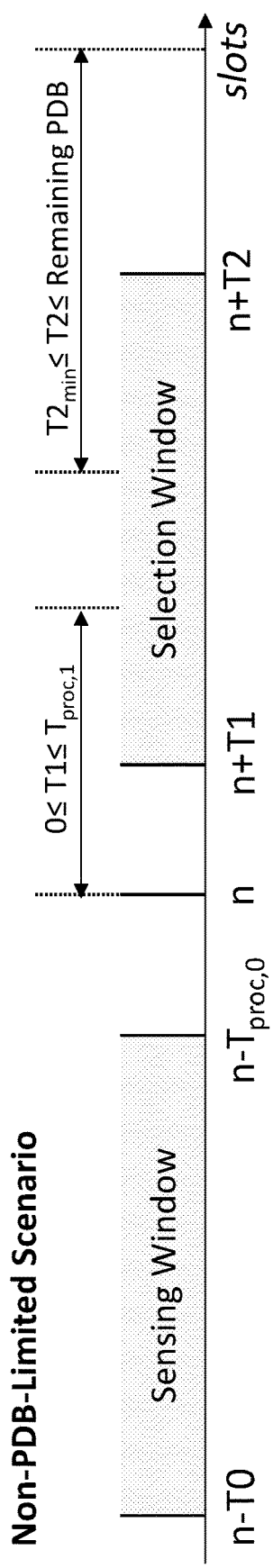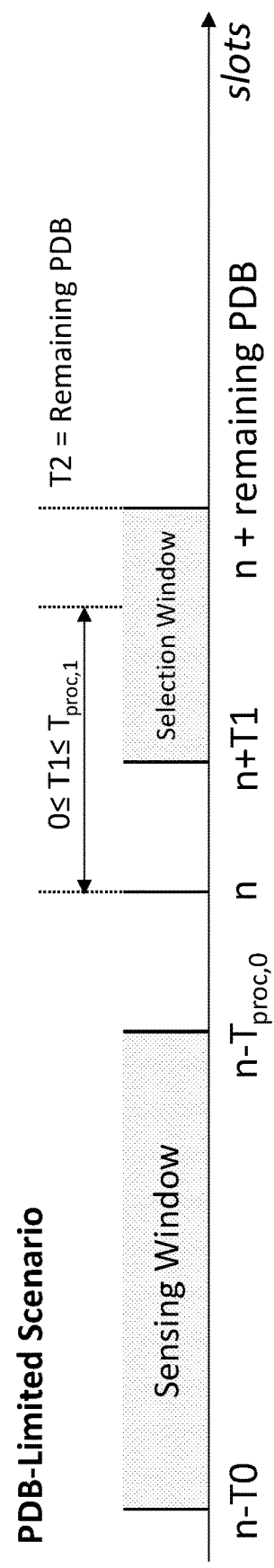
Fig. 7A
Fig. 7B

COMMUNICATION APPARATUSES AND COMMUNICATION METHODS FOR MODE 2 RESOURCE (RE-)SELECTION FOR PACKET DELAY BUDGET LIMITED SCENARIO

TECHNICAL FIELD

The following disclosure relates to communication apparatuses and communication methods for New Radio (NR) communications, and more particularly to communication apparatuses and communication methods for Mode 2 resource (re-)selection for packet delay budget (PDB) limited scenario.

BACKGROUND

Vehicle-to-everything (V2X) communication allows vehicles to interact with public roads and other road users, and is thus considered a critical factor in making autonomous vehicles a reality.

To accelerate this process, 5G NR based V2X communications (interchangeably referred to as NR V2X communications) is being discussed by the 3rd Generation Partnership Project (3GPP) to identify technical solutions for advanced V2X services, through which vehicles (i.e. interchangeably referred to as communication apparatuses or user equipments (UEs) that support V2X applications) can exchange their own status information through sidelink (SL) with other nearby vehicles, infrastructure nodes and/or pedestrians. The status information includes information on position, speed, heading, etc.

In such V2X communications, there are at least two sidelink resource allocation modes being discussed by the 3GPP. In resource allocation Mode 1, SL resource(s) to be used by a UE for SL transmissions are scheduled by a base station (BS). In resource allocation Mode 2, the UE determines, i.e. the BS does not schedule, SL transmission resources within the SL resources configured by the BS/network or pre-configured SL resources. The 3GPP study on resource allocation also considers sensing and resource selection procedures for a Mode 2(a), in the context of a semi-persistent scheme where resource(s) are selected for multiple transmissions of different transmission blocks (TBs) and a dynamic scheme where resource(s) are selected for each TB transmission.

In the 3GPP RAN WG1 #98 meeting in Prague, the following items were considered:

The resource (re-)selection procedure includes the following steps:
  Step 1: Identification of candidate resources within the resource selection window (FFS details).
  Step 2: Resource selection for (re-)transmission(s) from the identified candidate resources (FFS details).
In Step 1 of the resource (re-)selection procedure, a resource is not considered as a candidate resource if:
  The resource is indicated in a received Sidelink Control Information (SCI) and the associated L1 Sidelink Reference Signal Received Power (SL-RSRP) measurement is above an SL-RSRP threshold.
  The SL-RSRP threshold is at least a function of the priority of the SL transmission indicated in the received SCI and the priority of the transmission for which resources are being selected by the UE.
  FFS details.

In RAN1 #98b meeting in Chongqing, it is agreed that a UE is expected to select resources within packet delay budget (PDB). It is also agreed that the identified resources is $\geq X$ % of the total number of resources in the selection window. Specifically, in agreement [98b-NR-16], for a given time instance n when resource (re-)selection and re-evaluation procedure is triggered, the resource selection window starts at a time instance 'n+T1', where $T1 \geq 0$, and ends at time instance 'n+T2'. The start of selection window T1 is up to UE implementation subjected to $T1 \leq T_{proc,1}$; whereas T2 is up to UE implementation with the following details as a working assumption:

$T2 \geq T2_{min}$
  If $T2_{min}$>remaining PDB, then $T2_{min}$ is modified to be equal to remaining PDB
  For further study, other details of $T2_{min}$ including whether the minimum window duration $T2_{min}$–T1 is a function of priority Further, UE selection of T2 shall fulfil the latency requirement, i.e. T2≤remaining PDB. A UE is expected to select resources for all intended (re-)transmission within the PDB, i.e. the number of intended (re-)transmissions is an input to the resource (re-)selection procedure.

According to the agreements, in step 1, when the ratio of identified candidate resource to the total number of resources in a resource selection window, is less than X %, all configured thresholds are increased by Y dB and the resource identification procedure is repeated. The value and the configurability of X is for further study, with at least one value of X is 20. Y is 3. Other conditions to stop reference signal received power (RSRP) are also for further study.

However, there has been no discussion on communication apparatuses and methods for Mode 2 resource (re-)selection for packet delay budget limited scenario, for example, when $T2_{min}$>remaining PDB.

There is thus a need for communication apparatuses and methods that provide feasible technical solutions for Mode 2 resource (re-)selection for PDB-limited scenario. Furthermore, other desirable features and characteristics will become apparent from the subsequent detailed description and the appended claims, taken in conjunction with the accompanying drawings and this background of the disclosure.

SUMMARY

Non-limiting and exemplary embodiment facilitates providing communication apparatuses and methods for Mode 2 resource (re-)selection for PDB-limited scenario.

According to a first embodiment of the present disclosure, there is provided a communication apparatus comprising: circuitry which, in operation, adjusts a candidate resource ratio based on a time period, and identifies a plurality of resource candidates based on the adjusted candidate resource ratio; and a transmitter, which, in operation, transmits a transmission block using a resource selected from the plurality of resource candidates.

According to a second embodiment of the present disclosure, there is provided a communication method comprising: adjusting a candidate resource ratio based on a time period; identifying a plurality of resource candidates based on the adjusted candidate resource ratio; and transmitting a transmission block using a resource selected from the plurality of resource candidates.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIGS. 7A and 7B illustrate flow diagrams illustrating a non-PDB-limited scenario and a PDB-limited scenario of resource (re-)selection process respectively according to various embodiments.

Figure 1:
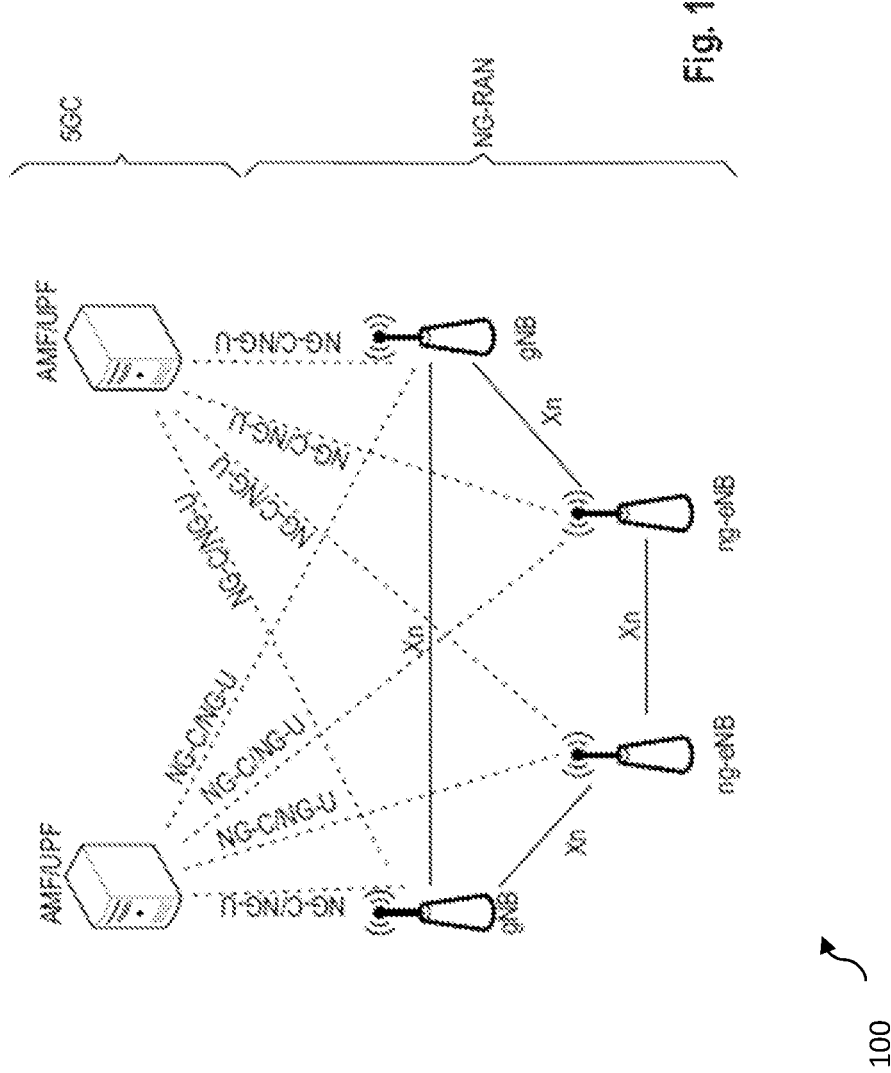
FIG. 1 shows an exemplary 3GPP NR-RAN architecture.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Some embodiments of the present disclosure will be described, by way of example only, with reference to the drawings. Like reference numerals and characters in the drawings refer to like elements or equivalents.

3GPP has been working at the next release for the 5$^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g. a particular core entity performing the AMF) by means of the NG-C interface and to the UPF (User Plane Function) (e.g. a particular core entity performing the UPF) by means of the NG-U interface. The NG-RAN architecture is illustrated in FIG. 1 (see e.g. 3GPP TS 38.300 v15.6.0, section 4).

The user plane protocol stack for NR (see e.g. 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see e.g. sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH(Physical Uplink Shared Channel) and PUCCH(Physical Uplink Control Channel) for uplink and PDSCH(Physical Downlink Shared Channel), PDCCH (Physical Downlink Control Channel) and PBCH(Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10$^{-5}$ within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g. subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

(Control Signals)

In the present disclosure, the downlink control signal (information) related to the present disclosure may be a signal (information) transmitted through PDCCH of the physical layer or may be a signal (information) transmitted through a MAC Control Element (CE) of the higher layer or the RRC. The downlink control signal may be a pre-defined signal (information).

The uplink control signal (information) related to the present disclosure may be a signal (information) transmitted through PUCCH of the physical layer or may be a signal (information) transmitted through a MAC CE of the higher layer or the RRC. Further, the uplink control signal may be a pre-defined signal (information). The uplink control signal may be replaced with uplink control information (UCI), the 1st stage sildelink control information (SCI) or the 2nd stage SCI.

(Base Station)

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a terminal may be adopted instead of a base station. The base station may be a relay apparatus that relays communication between a higher node and a terminal. The base station may be a roadside unit as well.

(Uplink/Downlink/Sidelink)

The present disclosure may be applied to any of uplink, downlink and sidelink.

The present disclosure may be applied to, for example, uplink channels, such as PUSCH, PUCCH, and PRACH, downlink channels, such as PDSCH, PDCCH, and PBCH, and side link channels, such as Physical Sidelink Shared Channel (PSSCH), Physical Sidelink Control Channel (PSCCH), and Physical Sidelink Broadcast Channel (PSBCH).

PDCCH, PDSCH, PUSCH, and PUCCH are examples of a downlink control channel, a downlink data channel, an uplink data channel, and an uplink control channel, respectively. PSCCH and PSSCH are examples of a sidelink control channel and a sidelink data channel, respectively. PBCH and PSBCH are examples of broadcast channels, respectively, and PRACH is an example of a random access channel.

(Data Channels/Control Channels)

The present disclosure may be applied to any of data channels and control channels. The channels in the present disclosure may be replaced with data channels including PDSCH, PUSCH and PSSCH and/or control channels including PDCCH, PUCCH, PBCH, PSCCH, and PSBCH.

(Reference Signals)

In the present disclosure, the reference signals are signals known to both a base station and a mobile station and each reference signal may be referred to as a Reference Signal (RS) or sometimes a pilot signal. The reference signal may be any of a DMRS, a Channel State Information—Reference Signal (CSI-RS), a Tracking Reference Signal (TRS), a Phase Tracking Reference Signal (PTRS), a Cell-specific Reference Signal (CRS), and a Sounding Reference Signal (SRS).

(Time Intervals)

In the present disclosure, time resource units are not limited to one or a combination of slots and symbols, and may be time resource units, such as frames, superframes, subframes, slots, time slot subslots, minislots, or time resource units, such as symbols, Orthogonal Frequency Division Multiplexing (OFDM) symbols, Single Carrier-Frequency Division Multiplexing Access (SC-FDMA) symbols, or other time resource units. The number of symbols included in one slot is not limited to any number of symbols exemplified in the embodiment(s) described above, and may be other numbers of symbols.

(Frequency Bands)

The present disclosure may be applied to any of a licensed band and an unlicensed band.

(Communication)

The present disclosure may be applied to any of communication between a base station and a terminal (Uu-link communication), communication between a terminal and a terminal (Sidelink communication), and Vehicle to Everything (V2X) communication. The channels in the present disclosure may be replaced with PSCCH, PSSCH, Physical Sidelink Feedback Channel (PSFCH), PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large delay compared with a symbol length or a slot length, such as an ultra-wideband transmission network.

(Antenna Ports)

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. The antenna port may also be defined as the minimum unit for multiplication of a precoding vector weighting.

Figure 2:
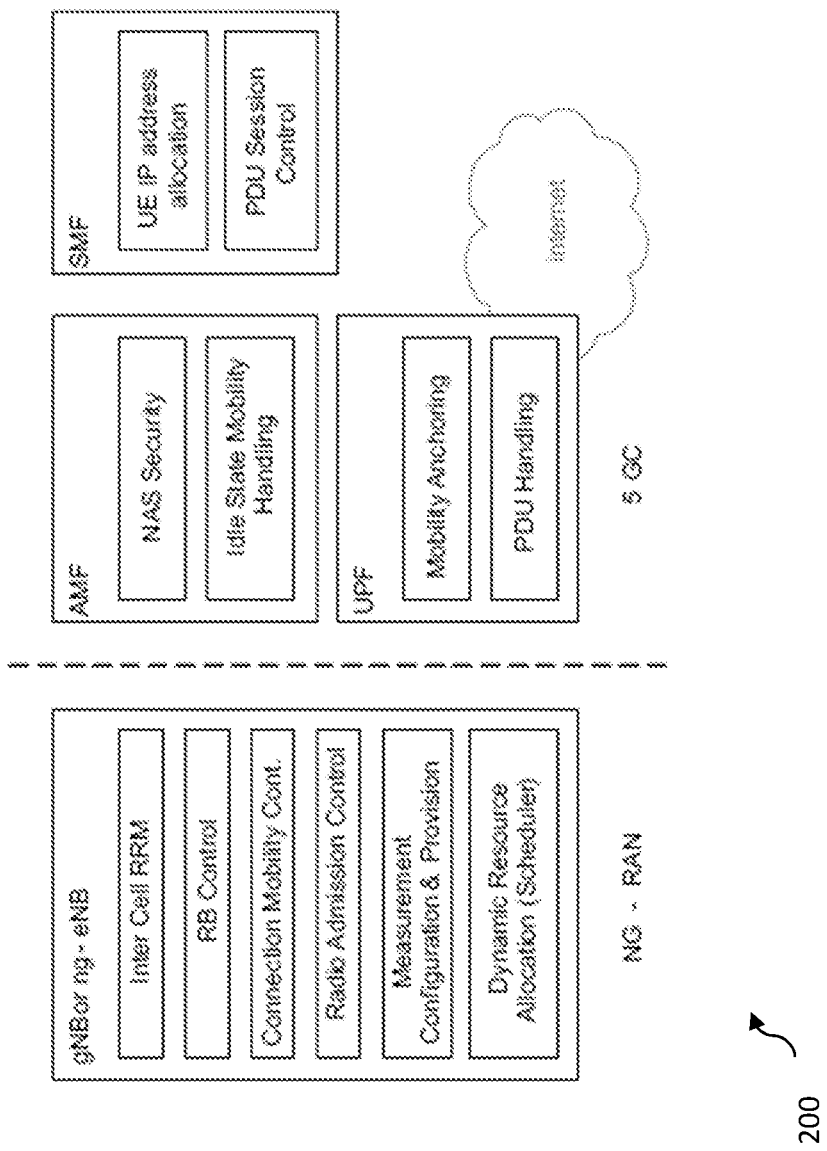
FIG. 2 depicts a schematic drawing which shows functional split between NG-RAN and 5GC.

FIG. 2 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

Functions for Radio Resource Management such as Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or OAM);

Measurement and measurement reporting configuration for mobility and scheduling;

Transport level packet marking in the uplink;

Session Management;

Support of Network Slicing;

QoS Flow management and mapping to data radio bearers;

Support of UEs in RRC_INACTIVE state;

Distribution function for NAS messages;

Radio access network sharing;

Dual Connectivity;

Tight interworking between NR and E-UTRA.

The Access and Mobility Management Function (AMF) hosts the following main functions:

Non-Access Stratum, NAS, signaling termination;

NAS signaling security;

Access Stratum, AS, Security control;

Inter Core Network, CN, node signaling for mobility between 3GPP access networks;

Idle mode UE Reachability (including control and execution of paging retransmission);

Registration Area management;

Support of intra-system and inter-system mobility;

Access Authentication;

Access Authorization including check of roaming rights;

Mobility management control (subscription and policies);

Support of Network Slicing;

Session Management Function, SMF, selection.

Furthermore, the User Plane Function, UPF, hosts the following main functions:

Anchor point for Intra-/Inter-RAT mobility (when applicable);

External PDU session point of interconnect to Data Network;

Packet routing & forwarding;

Packet inspection and User plane part of Policy rule enforcement;

Traffic usage reporting;

Uplink classifier to support routing traffic flows to a data network;

Branching point to support multi-homed PDU session;

QoS handling for user plane, e.g. packet filtering, gating, UL/DL rate enforcement;

Uplink Traffic verification (SDF to QoS flow mapping);

Downlink packet buffering and downlink data notification triggering.

Finally, the Session Management function, SMF, hosts the following main functions:

Session Management;

UE IP address allocation and management;

Selection and control of UP function;

Configures traffic steering at User Plane Function, UPF, to route traffic to proper destination;

Control part of policy enforcement and QoS;

Downlink Data Notification.

Figure 3:
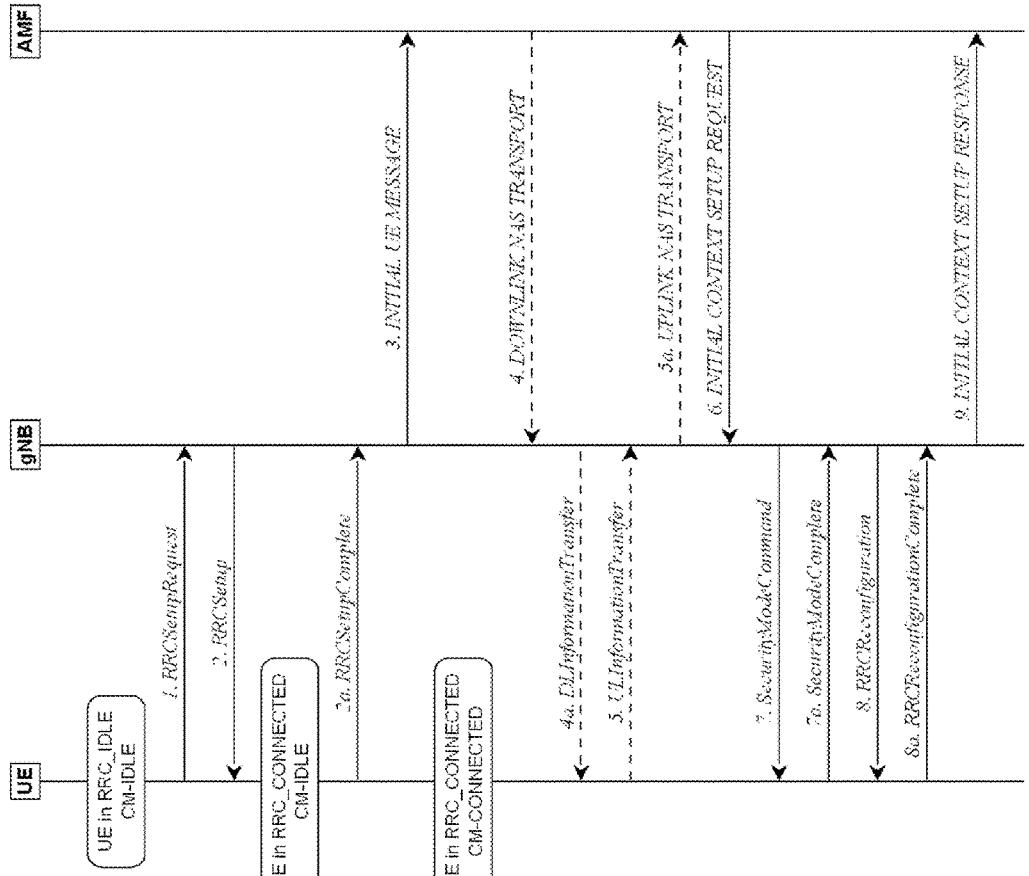
FIG. 3 depicts a sequence diagram for RRC connection setup/reconfiguration procedures.

FIG. 3 illustrates some interactions between a UE, gNB, and AMF (an 5GC entity) in the context of a transition of the UE from RRC_IDLE to RRC_CONNECTED for the NAS part (see TS 38.300 v15.7.0). The transition steps are as follows:

Step 1: The UE requests to setup a new connection from RRC_IDLE.

Step 2/2a: The gNB completes the RRC setup procedure. NOTE: The scenario where the gNB rejects the request is described below.

Step 3: The first NAS message from the UE, piggybacked in RRCSetupComplete, is sent to AMF.

Step 4/4a/5/5a: Additional NAS messages may be exchanged between UE and AMF, see TS 23.502 [22].

Step 6: The AMF prepares the UE context data (including PDU session context, the Security Key, UE Radio Capability and UE Security Capabilities, etc.) and sends it to the gNB.

Step 7/7a: The gNB activates the AS security with the UE.

Step 8/8a: The gNB performs the reconfiguration to setup SRB2 and DRBs.

Step 9: The gNB informs the AMF that the setup procedure is completed.

RRC is a higher layer signaling (protocol) used for UE and gNB configuration. In particular, this transition involves that the AMF prepares the UE context data (including e.g. PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

Figure 4:
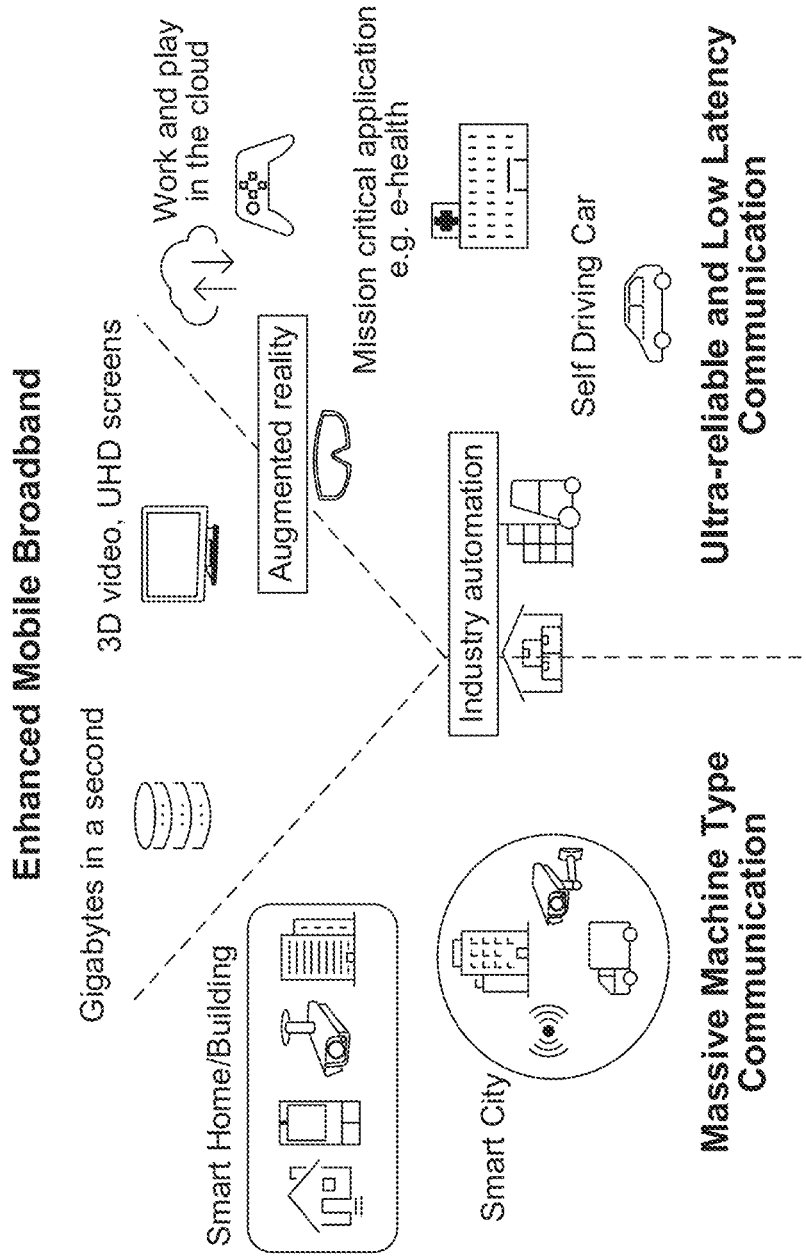
FIG. 4 depicts a schematic drawing showing usage scenarios of Enhanced mobile broadband (eMBB), Massive Machine Type Communications (mMTC) and Ultra Reliable and Low Latency Communications (URLLC).

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see e.g. ITU-R M.2083 FIG. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1 E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1 E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^{-6}$ level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from the physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g. as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
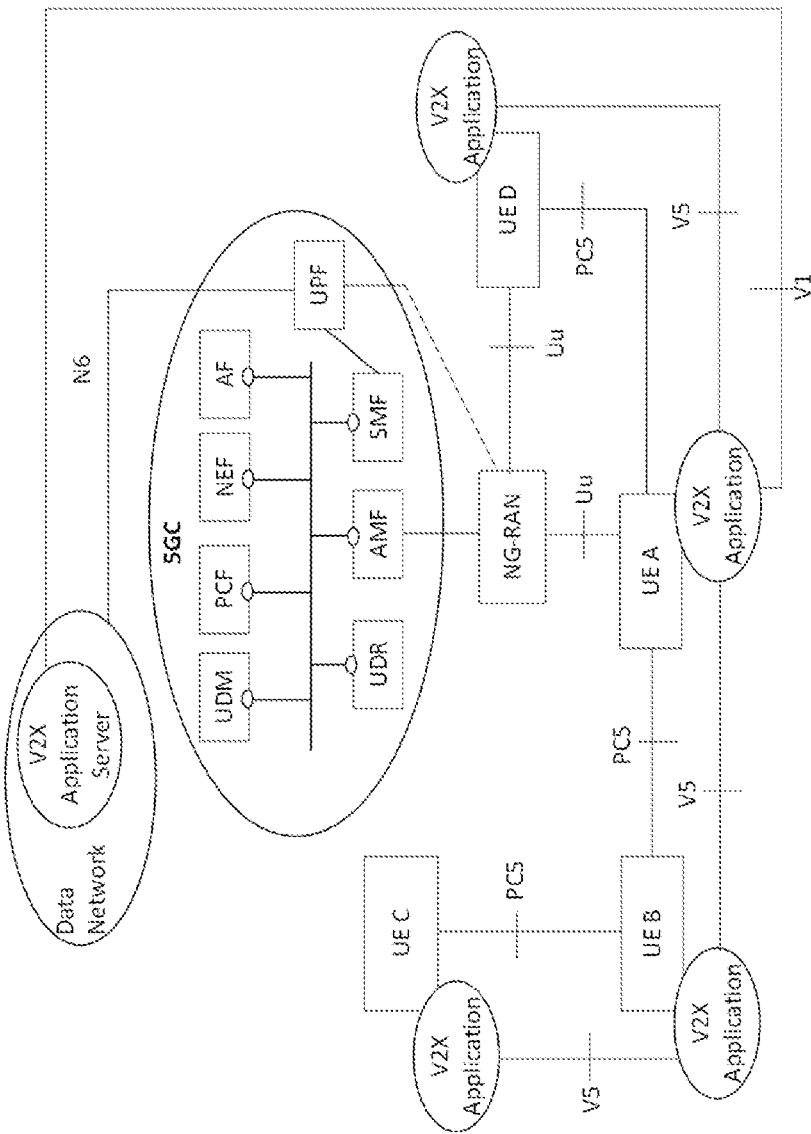
FIG. 5 shows a block diagram showing an exemplary 5G system architecture for V2X communication in a non-roaming scenario.

FIG. 5 illustrates a 5G NR non-roaming reference architecture (see TS 23.287 v16.0.0, section 4.2.1.1). An Application Function (AF), e.g. an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g. QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture for V2X communication, namely, Unified Data Management (UDM), Policy Control Function (PCF), Network Exposure Function (NEF), Application Function (AF), Unified Data Repository (UDR), Access and Mobility Management Function (AMF), Session Management Function (SMF), and User Plane Function (UPF) in the 5GC, as well as with V2X Application Server (V2AS) and Data Network (DN), e.g. operator services, Internet access or 3rd party services. All of or a part of the core network functions and the application services may be deployed and running on cloud computing environments.

In RAN1#98b meeting in Chongqing, agreements provide that in step 1, when the ratio of identified candidate resources (X) to the total number of resources ($M_{total}$) in a resource selection window, i.e. [n+T1, n+T2] is less than X %, all configured thresholds including RSRP threshold level are increased by Y dB and the resource identification procedure is repeated. It is agreed that at least one value of the candidate resource ratio X is 20, and the value of Y is 3. On the other hand, the configurability of candidate resource ratio X and other conditions to stop RSRP threshold level increment can be further studied.

According to the agreements, in step 1, when the ratio of identified candidate resource to the total number of resources in a resource selection window, is less than X %, all configured thresholds are increased by Y dB and the resource identification procedure is repeated. The value and the configurability of X is for further study, with at least one value of X is 20. Y is 3. Other conditions to stop reference signal received power (RSRP) are also for further study.

More specifically, the PHY layer sensing and reporting of resources in LTE V2X are defined in the TS36.213 section 14.1.1.6 as per the following steps:

1) A candidate single-subframe resource for PSSCH transmission $R_{x,y}$ is defined as a set of $L_{subCH}$ contiguous sub-channels with sub-channel x+j in subframe $t_y^{SL}$ where j=0, ..., $L_{subCH}$−1. The UE shall assume that any set of $L_{subCH}$ contiguous sub-channels included in the corresponding PSSCH resource pool (described in 14.1.5) within the time interval [n+T$_1$, n+T$_2$] corresponds to one candidate single-subframe resource, where selections of T$_1$ and T$_2$ are up to UE implementations under T$_1$≤4 and T$_{2min}$(prio$_{TX}$)≤T$_2$≤100, if T$_{2min}$(prio$_{TX}$) is provided by higher layers for prio$_{TX}$, otherwise 20≤T$_2$≤100. UE selection of T$_2$ shall fulfil the latency requirement. The total number of the candidate single-subframe resources is denoted by $M_{total}$.

2) The UE shall monitor subframes $t_{n'-10\times P_{step}}^{SL}$, $t_{n'-10\times P_{step}}^{SL}+1, \ldots, t_{n'-1}^{SL}$ except for those in which its transmissions occur, where $t_n^{SL}$=n if subframe n belongs to the set ($t_0^{SL}, t_1^{SL}, \ldots, t_{T_{max}}^{SL}$), otherwise subframe $t_n^{SL}$ is the first subframe after subframe n belonging to the set ($t_0^{SL}, t_1^{SL}, \ldots, t_{T_{max}}^{SL}$). The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:
   the UE has not monitored subframe $t_m^{SL}$ in Step 2.
   there is an integer j which meets y+j×P'$_{rsvp\_TX}$=z+P$_{step}$×k×q where j=0, 1, ..., $C_{reset}$−1, P$_{rsvp\_TX}$'=P$_{step}$×P$_{rsvp\_TX}$/100, k is any value allowed by the higher layer parameter restrictResourceReservationPeriod and q=1, 2, ..., Q. Here, $$Q = \frac{1}{k}$$

if k<1 and n'−z≤P$_{step}$×k, where $t_n^{SL}$=n if subframe n belongs to the set $t_0^{SL}, t_1^{SL}, \ldots, t_{T_{max}}^{SL}$, otherwise subframe $t_n^{SL}$ is the first subframe belonging to the set $t_0^{SL}, t_1^{SL}, \ldots, t_{T_{max}}^{SL}$ after subframe n; and Q=1 otherwise.

6) The UE shall exclude any candidate single-subframe resource $R_{x,y}$ from the set $S_A$ if it meets all the following conditions:
   the UE receives an SCI format 1 in subframe $t_m^{SL}$, and "Resource reservation" field and "Priority" field in the received SCI format 1 indicate the values P$_{rsvp\_RX}$ and prio$_{RX}$, respectively according to Subclause 14.2.1.
   PSSCH-RSRP measurement according to the received SCI format 1 is higher than $Th_{prio_{TX},prio_{RX}}^{SL}$.
   the SCI format received in subframe $t_m^{SL}$ or the same SCI format 1 which is assumed to be received in subframe(s)

$$t_{m+q\times P_{step}\times P_{rsvp\_RX}}^{SL}$$

determines according to 14.1.1.4C the set of resource blocks and subframes which overlaps with $$R_{x,y+j\times P'_{rsvp\_TX}}$$

for q=1, 2, ..., Q and j=0, 1, ..., $C_{reset}$−1. Here, $$Q = \frac{1}{P_{rsvp\_RX}}$$

if P$_{rsvp\_RX}$<1 and n'−m≤P$_{step}$×P$_{rsvp\_RX}$, where $t_n^{SL}$=n if subframe n belongs to the set ($t_0^{SL}, t_1^{SL}, \ldots, t_{T_{max}}^{SL}$), otherwise subframe $t_n^{SL}$ is the first subframe after subframe n belonging to the set ($t_0^{SL}, t_1^{SL}, \ldots, t_{T_{max}}^{SL}$); otherwise Q=1.

7) If the number of candidate single-subframe resources remaining in the set $S_A$ is smaller than 0.2·$M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels x+k for k=0, ..., $L_{subCH}$−1 in the monitored subframes in Step 2 that can be expressed by $t_{y-P_{step}^{*}j}^{SL}$ for a non-negative integer j if P$_{rsvp\_TX}$≤100, and $$t_{y-P'_{rsvp\_TX}*j}^{SL}$$

for a non-negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to 0.2·$M_{total}$.

10) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall then report set $S_B$ to higher layers.

According to various embodiments of the present disclosure, the term "candidate resource" may be used interchangeably with the term "resource candidate".

Figure 6:
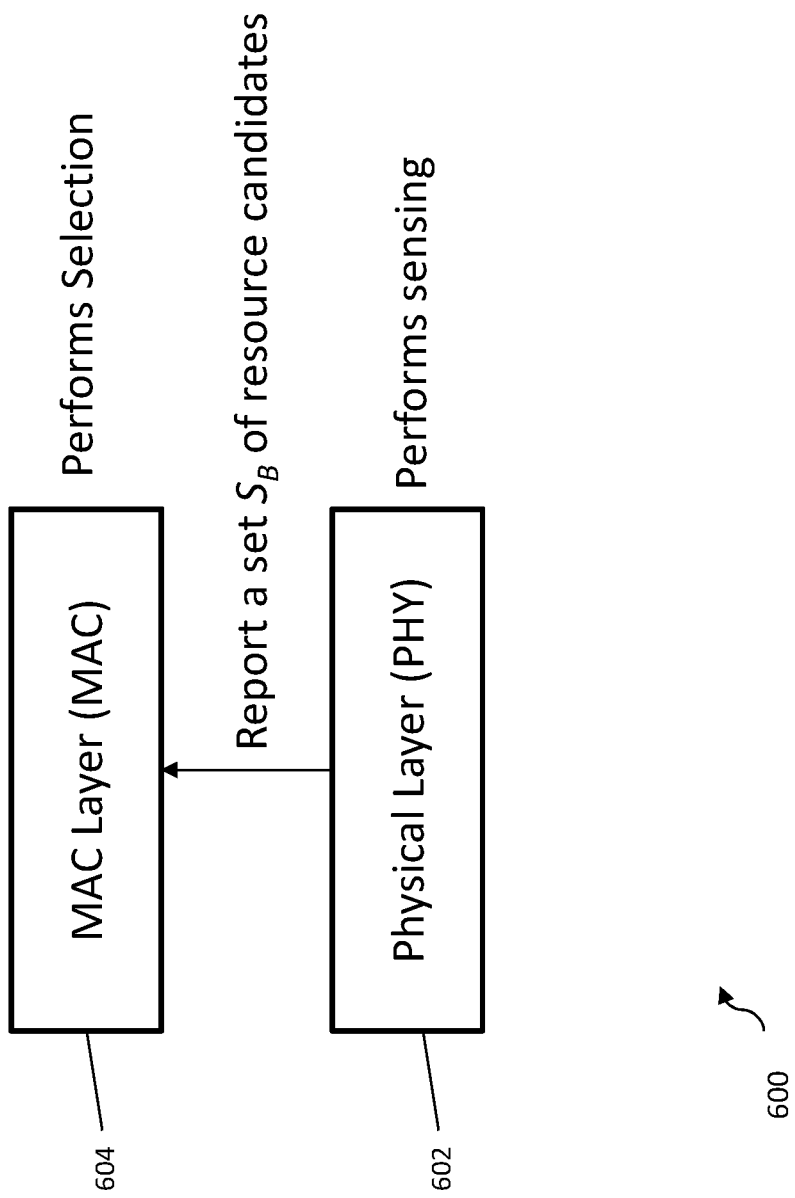
FIG. 6 depicts a schematic diagram 600 illustrating a V2X resource sensing & selection process according to various embodiments.

FIG. 6 depicts a schematic diagram 600 illustrating a V2X resource sensing and (re-)selection process according to various embodiments. For example, the PHY layer 602 of a UE performs sensing procedures for a preliminary plurality of resource candidates, such as initial set of $S_A$ and then reports a plurality of resource candidates, such as set $S_B$ to the MAC layer 604 of the UE or the base station. The initial set of $S_A$ contains all $M_{total}$ candidate resources for a transmission of a transmission block (TB). According to the present disclosure, the PHY layer 602 may perform, during the sensing procedures, a step of resource exclusion from the initial set $S_A$. A number of iterations of the exclusion process may be carried out such that the number of resource candidates in set $S_A$ is not smaller than X %*$M_{total}$, where X is a candidate resource ratio between a remaining number of the resource candidates in the set and total number of the resource candidates $M_{total}$. Correspondingly, the set $S_B$ that is reported to the MAC layer 604 contains ≤X %*$M_{total}$, resource candidates with the lowest RSRP from the remaining set $S_A$ after the resource exclusion step.

Thereafter, the MAC layer 604 may perform resource selection. In an embodiment, the MAC layer 604 performs a random selection from the plurality of resource candidate, e.g. set $S_B$, for transmission of the transmission block.

The UE(s) may include, for example, communication modules integrated or installed in vehicles subscribed to communication services of one or more telecommunications/Public Land Mobile Network (PLMN) operators. The UE(s) may be subscribed to a telecommunication/PLMN operator operator and communicates with a base station of the telecommunication operator. The base station may be a next generation NodeB (gNB). It can be appreciated by those skilled in the art that the base station can also be a ng-eNB, and may be connected via the NG interface to a 5G core network.

According to the present disclosure, the resource candidate ratio X is adjusted or configured differently depending on resource selection scenario, e.g. non-PDB-limited scenario or PDB-limited scenario. FIGS. 7A and 7B depict a flow diagram illustrating a non-PDB-limited scenario and a PDB-limited scenario of resource (re-)selection process respectively according to various embodiments. The PHY layer 602 may perform sensing procedures for resource candidates within a time period of sensing window [n−T1, n−$T_{proc,0}$]. For example, within this time period of sensing window [n−T0, n−$T_{proc,0}$], the PHY layer 602 of a UE may perform sensing procedures for resource candidates from an initial set $S_A$ and then reports a set of resource candidates $S_B$ to the MAC layer 604 of the UE or the base station.

The MAC layer 604 may perform a (re-)selection procedure based on a set of resource candidates $S_B$ provided by a lower layer, such as PHY layer 602. In an embodiment, at given time instance n, a resource (re-)selection and re-evaluation procedure may be triggered. The resource (re-)selection window starts at time instance 'n+T1', where T1≥0. T1 is up to UE implementation, where 0≤T1≤$T_{proc,1}$, resulting in a time instance of a start of selection window 'n+T1' to fall between [n, n+$T_{proc,1}$], where $T_{proc,1}$ is a processing latency for triggering the resource (re-) selection and re-evaluation procedure.

The resource (re-)selection window ends at time instance 'n+T2', and T2 is up to UE implementation with the following details as working assumption:

(i) T2≤$T2_{min}$, where $T2_{min}$ is provided by the higher layer, such as MAC layer 604;

(ii) if $T2_{min}$>remaining PDB, then $T2_{min}$ is modified to be equal to remaining PDB; and (iii) T2 selected by UE shall fulfil the latency requirement, i.e. T2≤remaining PDB;

where a PDB is a per-QoS-class upper bound for a delay of data packet to be transferred by a UE established in 3GPP specification. A PDB may be (pre-) configured for an UE, such that for a UE performing (re-)evaluation and (re-) selection of resources for transmission, a TB is to be transmitted or a resource is to be selected by the UE before the end of the PDB.

In various embodiments below, a remaining PDB refers to a remaining time before the end of a PDB (pre-)configured for an UE. For example, at given time instance [n] when a resource (re-)selection and re-evaluation procedure is triggered, time instance 'n+remaining PDB' corresponds to the end of the PDB. $T2_{min}$ is provided by a higher layer such as MAC layer 604 to indicate the lower boundary of which a resource selection time period may end. In various embodiments below, $T2_{min}$ and remaining PDB are used and compared against each other to determine if a resource selection time period corresponds to a PDB-limited scenario or a non-PDB limited scenario.

In a resource selection scenario where $T2_{min}$ provided by a higher layer does not exceed the remaining PDB ($T2_{min}$<remaining PDB), T2 can be implemented to any between $T2_{min}$ and remaining PDB. Such scenario refers to a non-PDB-limited scenario, where the resource selection window or time period ends at a time instance 'n+T2' where $T2_{min}$≤T2≤remaining PDB, as illustrated in FIG. 7A.

In a resource selection scenario where $T2_{min}$ provided by a higher layer exceeds the remaining PDB ($T2_{min}$>remaining PDB), such scenario refers to a PDB-limited scenario, where the resource selection window or time period is set to end at time instance 'n+remaining PDB', as illustrated in FIG. 7B, where T2=remaining PDB.

A UE is expected to select resources for all intended (re-)transmission within the PDB, i.e. the number of intended (re-)transmission is an input to the resource (re-) selection procedure. As depicted in FIGS. 7A and 7B, given the resource selection time period in both scenarios starts at time instance 'n+T1', a selection window for the PDB-limited scenario will be shorter than that for the non-PDB-limited scenario due to its limited remaining PDB. For a PDB-limited scenario where the selection window is limited by remaining PDB, the selection window of [n+T1, n+remaining PDB] could be too short for the UE to carry out the selection, or that there may be not enough resource corresponding to a candidate resource ratio of a legacy operation. Therefore, it is an object of the present disclosure to substantially overcome the existing challenges as discussed above to provide communication apparatuses and communication methods for Mode 2 resource (re-)selection for packet delay budget limited scenario.

Figure 8:
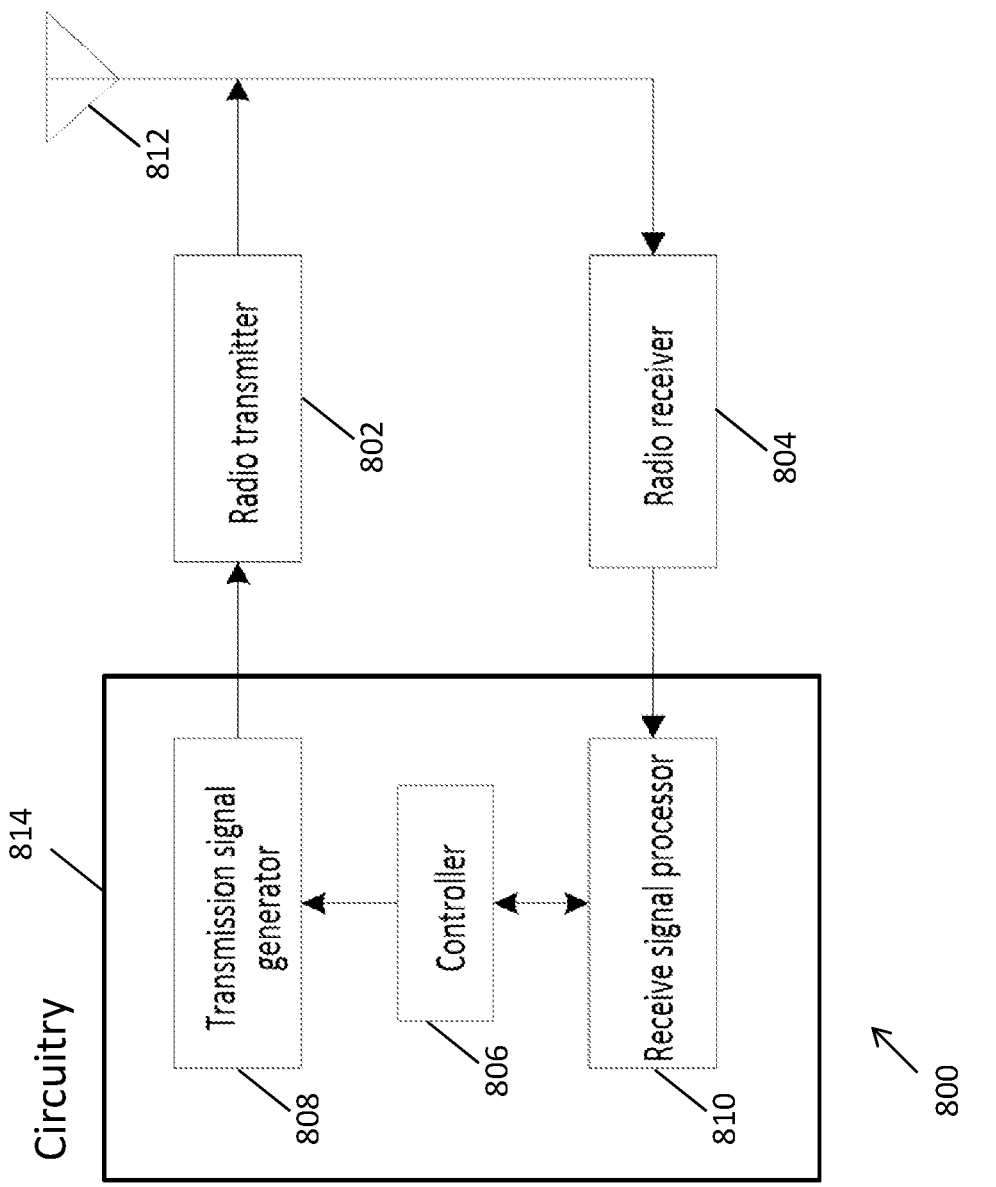
FIG. 8 shows a schematic example of communication apparatus in accordance with various embodiments. The communication apparatus may be implemented as an UE and configured for Mode 2 resource (re-)selection for PDB-limited scenario in according with the present disclosure.

FIG. 8 shows a schematic, partially sectioned view of the communication apparatus 800 according to the present disclosure. The communication apparatus 800 may be implemented as a UE according to various embodiments below. Various functions and operations of the communication apparatus 800 are arranged into layers in accordance with a hierarchical model. In the model, lower layers report to higher layers and receive instructions therefrom in accordance with 3GPP specifications. For the sake of simplicity, details of the hierarchical model are not discussed in the present disclosure.

As shown in FIG. 8, the communication apparatus 800 may include circuitry 804, at least one radio transmitter 802, at least one radio receiver 804, and at least one antenna 812 (for the sake of simplicity, only one antenna is depicted in FIG. 8 for illustration purposes). The circuitry 814 may include at least one controller 806 for use in software and hardware aided execution of tasks that the at least one controller 806 is designed to perform, including control of communications with one or more other communication apparatuses in a wireless network. The circuitry 814 may furthermore include at least one transmission signal generator 808 and at least one receive signal processor 810. The at least one controller 806 may control the at least one transmission signal generator 808 for generating signals (for example, a signal containing release information relating to a reserved resource) to be sent through the at least one radio transmitter 802 to one or more other communication apparatuses and the at least one receive signal processor 810 for processing signals (for example, a signal containing release information relating to a reserved resource) received through the at least one radio receiver 804 from the one or more other communication apparatuses under the control of the at least one controller 806. The at least one transmission signal generator 808 and the at least one receive signal processor 810 may be stand-alone modules of the communication apparatus 800 that communicate with the at least one controller 806 for the above-mentioned functions, as shown in FIG. 8. Alternatively, the at least one transmission signal generator 808 and the at least one receive signal processor 810 may be included in the at least one controller 806. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 802, at least one radio receiver 804, and at least one antenna 812 may be controlled by the at least one controller 806.

The communication apparatus 800, when in operation, provides functions required for Mode 2 resource (re-)selection for PDB-limited scenario. For example, the communication apparatus 800 may be a UE, and the circuitry 814 may, in operation, adjust a candidate resource ratio based on a time period, and identifies a plurality of resource candidates based on the adjusted candidate resource ratio. The radio transmitter 802 may, in operation, transmit a TB using a resource selected from the plurality of resource candidates.

In various embodiments, the time period may refer to a resource selection time period or resource selection window, which will be used for comparing against a minimum time period for a non-PDB-limited scenario based from a same starting time instance. In particular, the circuitry may be further configured determine if the time period, does not exceed a minimum time period, for example indicated by a higher layer signalling. Such minimum time period may refers to the minimum time period for a non-PDB-limited scenario. For example, the time period may refer to a resource selection time period [n+T1, n+T2] and the minimum time period of non-PDB-limited scenario may refer to [n+T1, n+T2$_{min}$] based from the same starting time instance 'n+T1', where T2$_{min}$ is indicated by MAC layer 604, wherein a PDB-limited scenario or a non-PDB-limited scenario may be identified as a result of determining the time period does not exceed or exceeds the minimum time period, respectively.

According to the present disclosure, the candidate resource ratio may refer to a count ratio between a remaining count and an initial count of the plurality of resource candidates. The candidate resource ratio may be adjusted based on the time period. In an embodiment, the circuitry may be configured to adjust the candidate resource ratio to be a constant value in response to determining the time period exceeds the minimum time period. In another embodiment, the circuitry may be configured to adjust the candidate ratio to be different from the constant value in response to determining the time period does not exceed the minimum time period. Yet in another embodiment, the circuitry may be configured to adjust the candidate resource ratio to be a value greater than the constant value, in response to determining the time period does not exceed the minimum time period, wherein in an embodiment, the value greater than the constant value increase disproportionately with a length of the time period.

The circuitry may be further configured to determine if a priority level exceeds a threshold value, wherein the priority level value exceeding the threshold value corresponds to a low priority level, the low priority level indicating a low priority in scheduling the selected resource for transmitting the transmission block, wherein the candidate resource ratio is adjusted based on the time period in response to the determination of the priority level value.

The circuitry may be further configured to increase a parameter, such as Reference Signal Received Power (RSRP) threshold level Th$_{a,b}$, by a fixed value, e.g. 3 dB, for each iteration of an exclusion process of a preliminary plurality of resource candidates (e.g. set S$_A$) in response to determining the preliminary plurality of resource candidates is less than the candidate resource ratio, the preliminary plurality of resource candidates comprising the plurality of resource candidates, the RSRP threshold level being a maximum average power, wherein a resource candidate of the preliminary plurality of resource candidates with RSRP lower than the RSRP threshold level will be excluded in the exclusion process. The circuitry may be further configured to increase the parameter by another fixed value, e.g. a value other than 3 dB, in response to the determination of the time period, e.g. time period<minimum time period, or in particular, in response to the determination of a PDB-limited scenario. In a similar embodiment, the circuitry may further configured to increase the parameter by a value greater than a fixed value, e.g. 6 dB, in response to the determination of the time period, e.g. time period<minimum time period, or in particular, in response to the determination of a PDB-limited scenario.

The circuitry may be further configured to identify the plurality of resource candidates from a preliminary plurality of resource candidates (e.g. set S$_A$) in response to determining the preliminary plurality of resource candidates is not less than the candidate resource ratio, the preliminary plurality of resource candidates comprising the plurality of resource candidates, the plurality of resource candidates being not less than the candidate resource ratio; and report the plurality of resource candidates to a higher layer.

The circuitry may be further configured to select a resource from the plurality of resource candidates. The circuitry may be further configured to determine a minimum count and/or a maximum count of resource candidates, wherein the identification of the plurality of resource candidates is based on the maximum count and/or the minimum count of resource candidates.

The circuitry may be further configured to adjust the candidate resource ratio depending on at least one of priority level, RSRP threshold, congestion level, cell and geographical area.

The circuitry may be further configured to decrease a priority level value for the transmission of the transmission block in response to the determination of the time period, e.g. time period<minimum time period, or in particular, in response to the determination of a PDB-limited scenario, wherein a low priority level value corresponds to a high priority level indicating a high priority in scheduling the selected resource for transmitting the transmission block.

Figure 9:
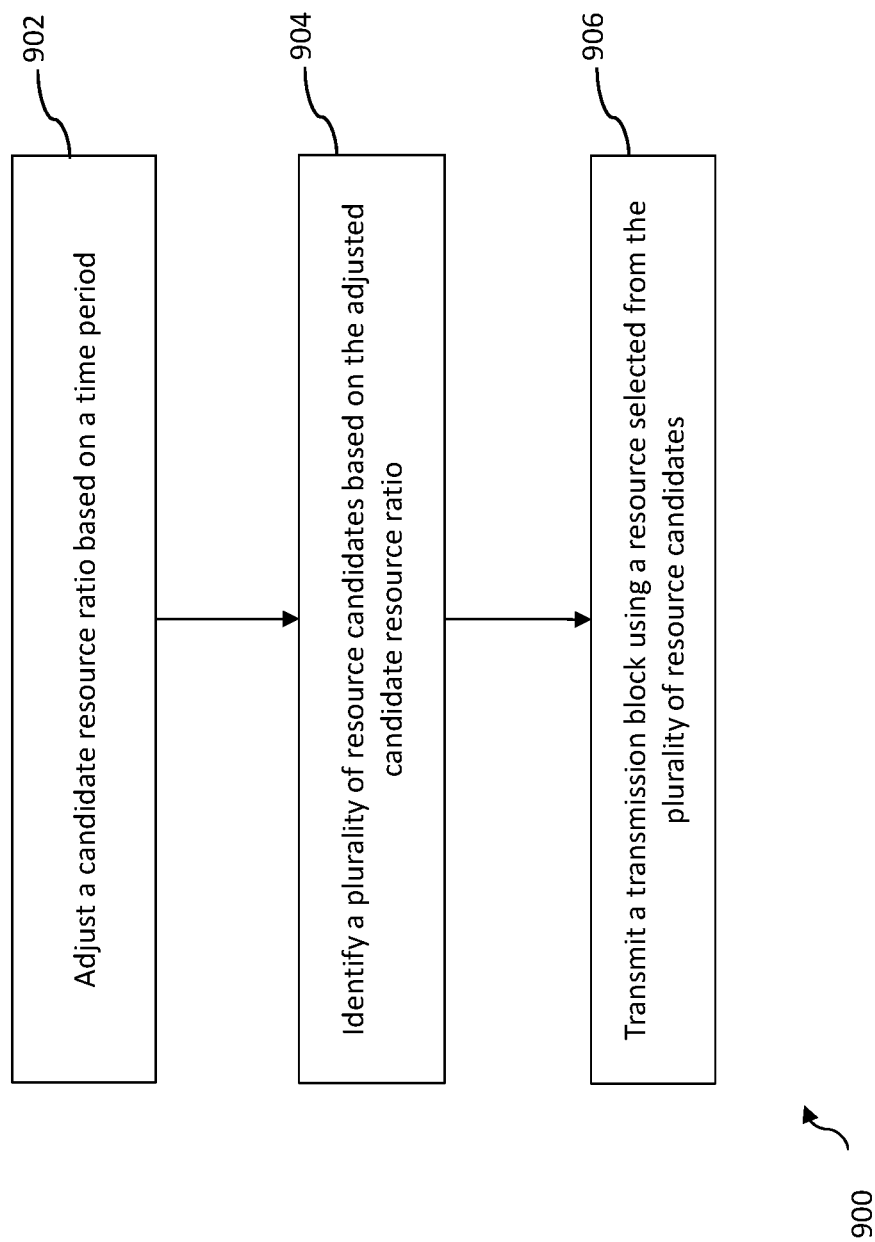
FIG. 9 shows a flow diagram illustrating a communication method according to various embodiments.

FIG. 9 shows a flow diagram 900 illustrating a communication method for Mode 2 resource (re-)selection for PDB-limited scenario according to the present disclosure. In step 902, a candidate resource ratio is adjusted based on a time period. In step 904, a plurality of resource candidates is then identified based on the adjusted candidate resource ratio. In step 906, a transmission block is transmitted using the selected resources from the plurality of resource candidates.

The method further comprises a step of determining if the time period does not exceed a minimum time period indicated by a higher layer signalling. In various embodiments of the present disclosure, a time period may refer to a resource selection window [n+T1, n+T2] and a minimum time period may refer to [n+T1, n+T2$_{min}$], where T2$_{min}$ is indicated by MAC layer 604, wherein a PDB-limited scenario or a non-PDB-limited scenario may be identified as a result of comparing the time period with the minimum time period. In an embodiment, in response to determining the time period exceed the minimum time period, a step of adjusting the candidate resource ratio to be a constant value or a value different from the constant value may be carried out. In another embodiment, in response to determining the time period exceed the minimum time period, a step of adjusting the candidate resource ratio to be a value greater than the constant value may be carried out, and the value greater than the constant value may increase disproportionately with a length of the time period.

In the following paragraphs, certain exemplifying embodiments are explained with reference to communication apparatuses and methods used for Mode 2 resource (re-)selection for PDB limited scenario.

According to an embodiment, determination of a PDB-limited scenario can be performed by comparing time instance 'n+T$_{min}$' against time instance 'n+remaining PDB', where T2$_{min}$ is provided by a higher layer such as MAC layer 604 to indicate a lower boundary at which a resource selection time period may end; remaining PDB refers to a remaining time before the end of a PDB, wherein the PDB may or may not be (pre-)configured for an UE; and n refers to a time instance of resource (re-)selection and re-evaluation being triggered. In particular, if it is determined that 'n+T$_{min}$' has a time instance prior to 'n+remaining PDB', e.g. T2$_{min}$<remaining PDB, T2 could then be set between T2$_{min}$ and remaining PDB, depending on UE implementation, corresponding to a non-PDB-limited scenario. On the other hand, if it is determined that 'n+T$_{min}$' has a time instance further to 'n+remaining PDB', e.g T2$_{min}$>remaining PDB, T2 is set to remaining PDB, corresponding a PDB-limited scenario.

According to another embodiment, determination of a PDB-limited scenario can be performed by determining if a resource selection window time period exceeds a minimum time period for a non-PDB-limited scenario starting based from a same starting time instance 'n+T1'. In particular, in a non-PDB-limited scenario, as T2 can be set between T2$_{min}$ remaining PDB, depending on UE implementation, the resource selection window time period can range from a minimum time period of [n+T1, n+T2$_{min}$] to a maximum time period of [n+T1, n+remaining PDB], as shown in FIG. 7A. If it is determined that a resource selection time period [n+T1, n+T2] exceeds the minimum time period of [n+T1, n+T2$_{min}$] of non-PDB-limited scenario, a resource selection under a non-PDB-limited scenario is determined. On the other hand, such minimum time period of non-PDB-limited scenario can be used for determining if a resource selection window time period based from the same starting time instance 'n+T1' corresponds to a PDB-limited scenario. If it is determined that a resource selection time period based from the same starting time instance 'n+T1' does not exceed the minimum time period [n+T1, T$_{min}$] of non-PDB-limited scenario, e.g. T$_{min}$>remaining PDB, a resource selection under a PDB-limited scenario is determined with a resource selection window of [n+T1, n+remaining PDB]. In various embodiments below, such minimum time period based from a same starting time instance 'n+T1' is used to determine if a resource selection window corresponds to a PDB-limited scenario or a non-PDB-limited scenario.

According to the present disclosure, a candidate resource ratio (X %) used for a PDB-limited scenario in identifying candidate resources is different from that for a non-PDB-limited scenario. In particular, for a PDB-limited scenario, a larger candidate resource ratio may be used in identifying candidate resources while the procedures and other parameters remain same as the PHY layer sensing and reporting of resources in LTE V2X are defined in the TS36.213 section 14.1.1.6 mentioned earlier.

In an embodiment, the candidate resource ratio for PDB-limited scenario may be (pre-)configured or specified differently in the standards for each of PDB-limited and non-PDB-limited scenarios. In another embodiment, the candidate resource ratio for PDB-limited scenario is scaled by a ratio by (pre-)configuration or specified in the standards. An example calculation used for determining the candidate resource ratio for PDB-limited scenario is illustrated in equation (1), as follows:

$$X = \frac{L_0}{L} X_0 \qquad \text{equation (1)}$$

where X is a candidate resource ratio used for PDB-limited scenario, X$_0$ is a default candidate resource ratio used for non-PDB-limited scenario, L is a length of time period of PDB-limited scenario, i.e. resource selection window [n+T1, n+remaining PDB] as shown in FIG. 7B, and L$_0$ is a length of time period of non-PDB-limited scenario, i.e. resource selection window [n+T1, n+T2], where T2$_{min}$≤T2≤remaining PDB as shown in FIG. 7A.

According to equation (1), the value of candidate resource ratio for PDB-limited scenario depends on the ratio of the time period of resource selection window of PDB-limited scenario and non-PDB-limited scenario, the value of candidate resource ratio for PDB-limited scenario is disproportionately increase with a shorter time period of resource selection window of PDB-limited scenario. For example, under a case where the default candidate resource ratio used for non-PDB-limited scenario is 20%, the selection windows for non-PDB-limited scenario and PDB-limited scenario are 30 ms and 10 ms respectively, the candidate resource ratio used for PDB-limited scenario is adjusted to 20%×(30/10), which is 60%. As such, the adjusted candidate resource ratio may provide greater number of resources within the limited time period of resource selection window.

Figure 10:
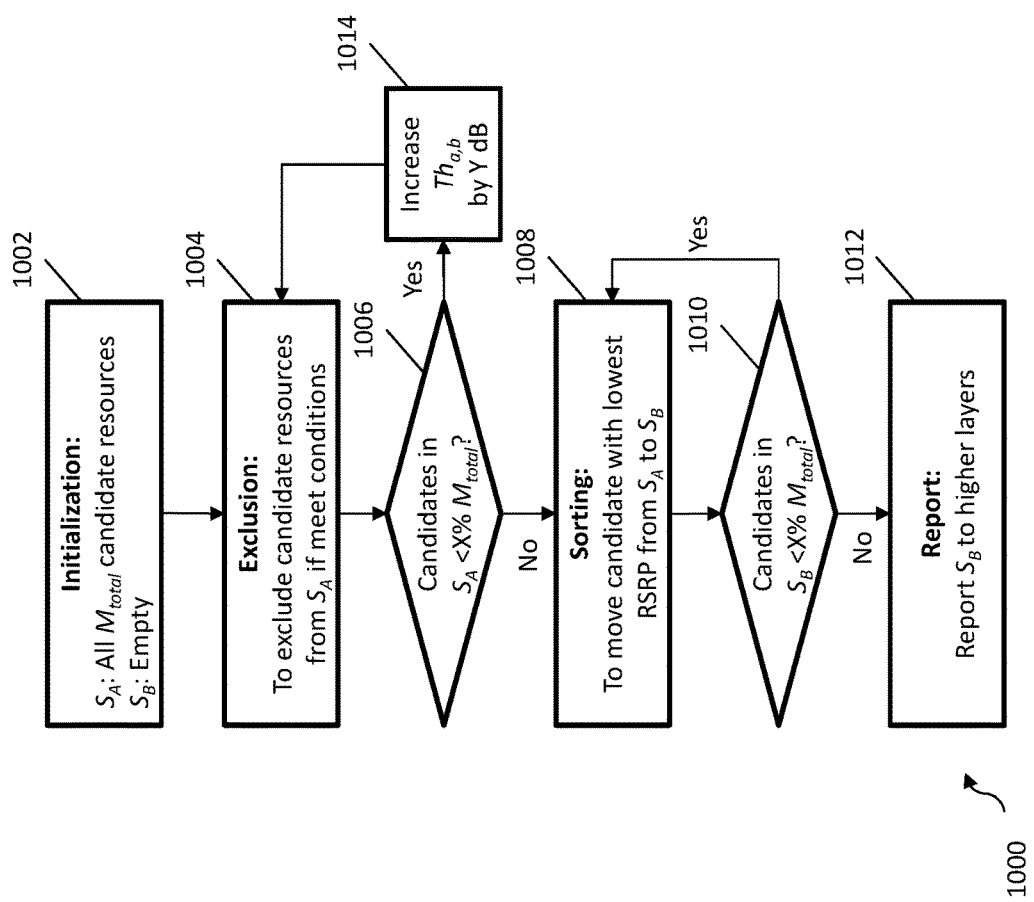
FIG. 10 shows a flow diagram illustrating how SL-RSRP is utilized in V2X resource sensing & selection according to an embodiment.

FIG. 10 shows a flow diagram 1000 illustrating how a PHY layer, such as the PHY layer 1002, performs sensing according to various embodiments. At step 1002, the PHY layer senses a preliminary plurality of resource candidates, such as set $S_A$ in an embodiment, with all $M_{total}$ resource candidates. At step 1004, the PHY layer performs a step of resource exclusion such that resource candidates are excluded from set $S_A$ if certain conditions are met. At step 1006, it is determined whether the number of resource candidates remaining in $S_A$ after the resource exclusion step 1004 is <X % $M_{total}$, (e.g. 20% as in LTE) where X refers to a resource candidate ratio in a percentage value.

If it is determined that the number of resource candidates remaining in $S_A$ after the resource exclusion step 1004 is <X % $M_{total}$, the process proceeds to step 1014 where the $Th_{a,b}$ is increased by Y dB, and then proceeds back to step 1004 for a repeated procedure of the resource exclusion process, until it is determined at step 1006 that the set $S_A$ contains≥X %*$M_{total}$ resource candidates.

Thereafter, the process proceeds to a sorting step 1008 where a resource candidate with lowest RSRP is moved from a preliminary plurality of resource candidates, such as set $S_A$. A number of sorting steps 1008 may be carried out to move a plurality of resource candidates with lowest RSRP (set $S_B$) from set $S_A$ until a certain conditions are met. Specifically, at step 1010, it is determined whether the number of resource candidates in set $S_B$<X % $M_{total}$. If it is determined that the number of resource candidates in set $S_B$ is <X % $M_{total}$, the process repeats sorting step 1008 until the number of resource candidates in set $S_B$ is X % $M_{total}$. At step 1012, the set $S_B$ is reported to the higher layers, for example the MAC layer 604.

In an embodiment, the candidate resource ratio X may be configured to be a percentage value of 20% in accordance with legacy operation, for example in the PHY layer sensing and reporting of resources in LTE V2X defined in the TS36.213 section 14.1.1.6. In another embodiment, the candidate resource ratio X configured to be a percentage value different from 20%. In various embodiments, the candidate resource ratio for PDB-limited scenario is different from that for non-PDB-limited scenario. In an embodiment, the candidate resource ratio for a non-PDB limited scenario may be a constant value (e.g. 20%) and the candidate resource ratio for a PDB-limited scenario is a value greater than the constant value. In such embodiment, the candidate ratio for the PDB-limited scenario may be calculated based on equation (1), where the candidate ratio for the PDB-limited scenario increases disproportionately with a length of PDB-limited resource selection time period. Yet in another embodiment, there may be upper boundary indicating a maximum candidate resource ratio that can be set for PDB-limited scenario. This may advantageously prevent the candidate resource ratio to fall beyond the upper boundary which results in too many resource candidates being identified under PDB-limited scenario.

Further, in an embodiment of step 1014, the $Th_{a,b}$ may be increased by the value of 3 dB (Y=3) for each iteration of resource exclusion step 1004 in accordance with legacy operation stated in the agreement [98b-NR-16]. In another embodiment, the increment of $Th_{a,b}$ at each iteration of the exclusion process can also be pre-configured and/or indicated by higher level signaling to be not limited to 3 dB each time. Yet in another embodiment, the $Th_a$, may increase by a value larger than Y dB step (e.g. Y>3 dB) during adjusting SL-RSRP threshold for PDB-limited scenario.

According to the present disclosure, in steps 1006 and 1010, the steps may, alternatively or additionally, comprises a step of determine a minimum count of resource candidates and/or a maximum count of resource candidates. In particular, in steps 1006 and 1010, the respective number of resource candidates remaining in set $S_A$ after the resource exclusion step 1004 and in set $S_B$ may be determined if they fall within the minimum count and/or maximum count of resource candidates, by actual counting the respective number of resource candidates remaining in set $S_A$ and in set $S_B$ instead of comparing against the candidate resource ratio X. The minimum count and maximum count may advantageously control the number of resource candidates being identified to hit at least the minimum count or not to fall beyond the maximum count under PDB-limited scenario.

Alternatively or additionally, under a PDB-limited scenario, a priority level for a transmission may increase, indicating a higher priority in scheduling is given to the selected resource for transmitting a transmission block. In an embodiment, there are 8 priority levels of $prio_{Tx}$ indicated using 3 bits as in LTE with a priority level value of 0 to 7. The priority levels can be categorized into two groups by pre-configuration or by higher level signaling, for example, a high priority level HighTx (for priority level value 0-3) and a low priority level LowTx (for priority level value 4-7), where a lower priority level value corresponds to a higher priority level.

According to the present disclosure, the UEs can be (pre-)configured or specified in the standards which operation to be triggered/adopted under different scenarios. For example, different operations can be (pre-)configured for different transmission priorities (or priority groups). For priority level value 0 to 3, i.e. high priority level, the operation may keep the candidate resource ratio as X, otherwise for priority level value 4 to 7, i.e. low priority level, the operation may scale the candidate resource ratio, e.g. according to resource selection time period or equation (1). In another embodiment, different operations may also be (pre-)configured for different (pre-)configured RSRP thresholds, congestion levels, cells and geographical areas by different operators and vendors.

Figure 11:
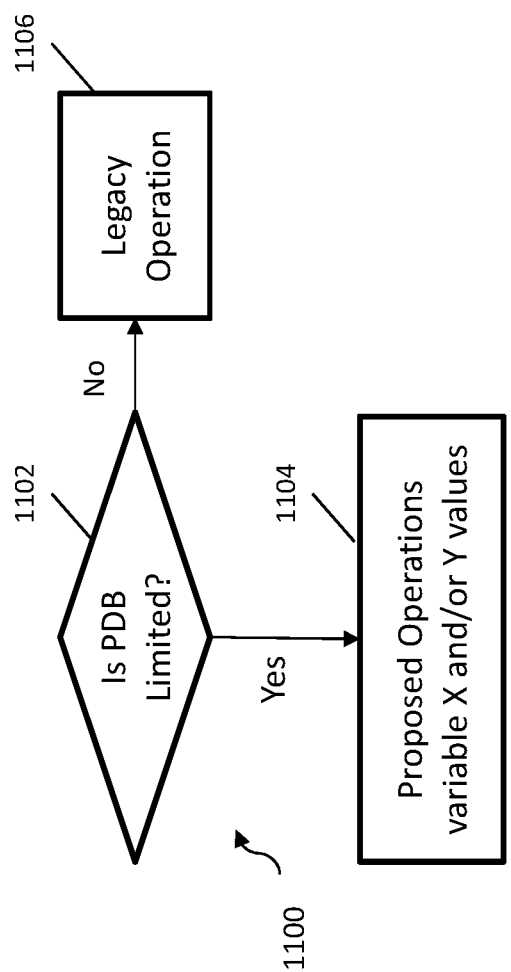
FIG. 11 shows a flow diagram illustrating operations before performing sensing operations in PHY layer according to an embodiment.

In an embodiment, the sensing operations in PHY layer 602 in FIG. 10 with the variable X and/or Y values may be performed and configured differently depending on the scenario, specifically, a PDB-limited scenario; otherwise a legacy operation may be carried out, for example, the PHY layer sensing and reporting of resources in LTE V2X are defined in the TS36.213 section 14.1.1.6 where X=20 and Y=3. FIG. 11 depicts a flow diagram illustrating operations before performing sensing operations in PHY layer according to an embodiment. In Step 1102, it is determined if it is a PDB-limited scenario. In an embodiment, the determination can be based on a $T2_{min}$ provided by a higher layer such as MAC layer 604 and remaining PDB preconfigured for the UE. In another embodiment, the determination can be based on a comparison between a minimum time period for a non-PDB-limited scenario with the resource selection time period starting from the same time instance such as 'n+T1'. It is determined in step 1102 that it is a PDB-limited scenario, for example, when $T2_{min}$>remaining PDB, or [n+T1, n+remaining PDB] does not exceed the minimum time period of [n+T1, n+$T2_{min}$] of non-PDB-limited scenario, step 1104 is carried out where the proposed operation variable X and/or Y values shown in FIG. 10 may be performed according to the various embodiments depicted above. If it is determined in step 1102 that it is a non-PDB-limited scenario, for example $T2_{min}$<remaining PDB, or [n+T1, n+remaining PDB] exceeds the minimum time period of [n+T1, n+$T2_{min}$] of non-PDB-limited scenario, legacy operation is performed in step 1106.

Figure 12:
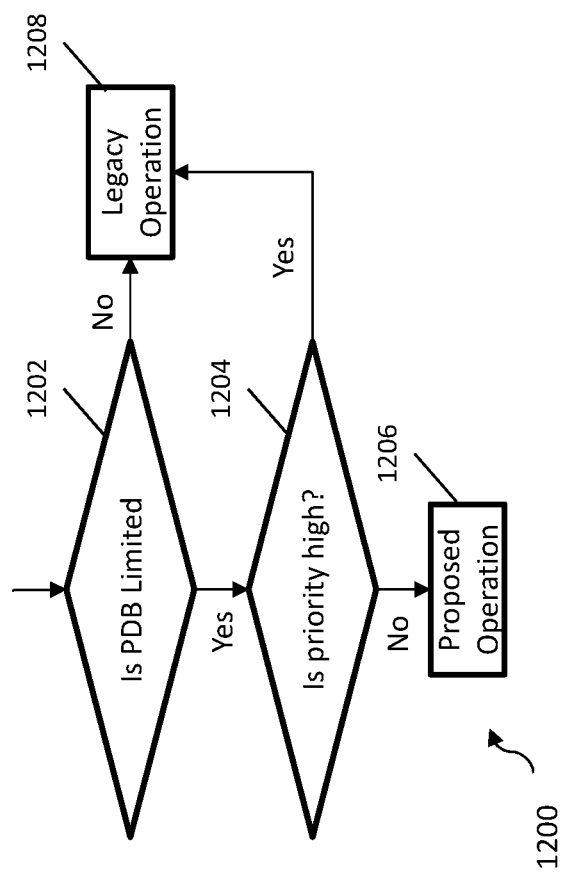
FIG. 12 shows a flow diagram illustrating operations before performing sensing operations in PHY layer according to another embodiment.

In another embodiment, determination of a PDB-limited scenario and a priority level may be carried out prior to the sensing operation in the PHY layer. FIG. 12 depicts a flow diagram illustrating operations before performing sensing operations in PHY layer according to another embodiment. In step 1202, it is determined if it is a PDB-limited scenario. The determination can be based on a time period in a similar manner as described in step 1102. If it is determined that it is a PDB-limited scenario, for example, when $T2_{min}$>remaining PDB, or [n+T1, n+remaining PDB] does not exceed the minimum time period of [n+T1, n+$T2_{min}$] of non-PDB-limited scenario, step 1204 is carried out. If it is determined that it is not a PDB-limited scenario, e.g. a non-PDB-limited scenario, for example $T2_{min}$<remaining PDB, or [n+T1, n+remaining PDB] exceeds the minimum time period of [n+T1, n+$T2_{min}$] of non-PDB-limited scenario, legacy operation is performed in step 1208.

In step 1204, it is further determined if a priority level is high. The determination may be based on priority level value by determining if a priority level value exceeds a threshold value, wherein the priority level value exceeding the threshold value corresponds to a low priority level, the low priority level indicating a low priority in scheduling a selected resource for transmitting a transmission block. If it is determined that the priority level is not high, i.e. priority level exceeds the threshold value, step 1206 is carried out, where the proposed operation variable X and/or Y values shown in FIG. 10 may be performed according to the various embodiments depicted above. If it is determined that the priority level is high, legacy operation is performed in step 1208.

As described above, the embodiments of the present disclosure provide an advanced communication system, communication methods and communication apparatuses for Mode 2 resource (re-)selection for PDB-limited scenario that advantageously adjusts candidate resource ratio based on a time period of resource selection window.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

The invention claimed is:
1. A communication apparatus, comprising:
circuitry, which, in operation:
determines a candidate resource ratio from a plurality of candidate resource ratios, wherein the determined candidate resource ratio is different between a first priority value and a second priority value different from the first priority value, and identifies a plurality of candidate resources based on the determined candidate resource ratio; and a transmitter, which, in operation, transmits a Physical Sidelink Shared Channel (PSSCH) on at least one resource selected from the identified plurality of candidate resources, wherein, for a case with the first priority value,
the determining the candidate resource ratio comprises determining a first candidate resource ratio from the plurality of candidate resource ratios, and
the identifying the plurality of candidate resources comprises multiplying the determined first candidate resource ratio by a total number of candidate resources in the case with the first priority value; and for a case with the second priority value,
the determining the candidate resource ratio comprises determining a second candidate resource ratio from the plurality of candidate resource ratios, and
the identifying the plurality of candidate resources comprises multiplying the determined second candidate resource ratio by a total number of candidate resources in the case with the second priority value.

2. The communication apparatus of claim 1, wherein the plurality of candidate resources are determined from an initial set of candidate resources based on the candidate resource ratio.

3. The communication apparatus of claim 1, wherein the plurality of candidate resource ratios include a ratio related to 20%.

4. The communication apparatus of claim 1, wherein the candidate resource ratio is configured for the communication apparatus.

5. A communication method comprising:
determining a candidate resource ratio from a plurality of candidate resource ratios, wherein the determined candidate resource ratio is different between a first priority value and a second priority value different from the first priority value;
identifying a plurality of candidate resources based on the determined candidate resource ratio; and
transmitting a Physical Sidelink Shared Channel (PSSCH) on at least one resource selected from the identified plurality of candidate resources, wherein for a case with the first priority value,
the determining the candidate resource ratio includes determining a first candidate resource ratio from the plurality of candidate resource ratios, and
the identifying the plurality of candidate resources includes multiplying the determined first candidate resource ratio by a total number of candidate resources in the case with the first priority value; and for a case with the second priority value,
the determining the candidate resource ratio includes determining a second candidate resource ratio from the plurality of candidate resource ratios, and
the identifying the plurality of candidate resources includes multiplying the determined second candidate resource ratio by a total number of candidate resources in the case with the second priority value.

6. The communication method of claim 5, wherein the plurality of candidate resources are determined from an initial set of candidate resources based on the candidate resource ratio.

7. The communication method of claim 5, wherein the plurality of candidate resource ratios include a ratio related to 20%.

8. The communication method of claim 5, wherein the candidate resource ratio is configured for a communication apparatus implementing the communication method.

9. An integrated circuit comprising:
circuitry, which, in operation, controls:
determining a candidate resource ratio from a plurality of candidate resource ratios, wherein the determined candidate resource ratio is different between a first priority value and a second priority value different from the first priority value;
identifying a plurality of candidate resources based on the determined candidate resource ratio; and
transmitting a Physical Sidelink Shared Channel (PSSCH) on at least one resource selected from the identified plurality of candidate resources, wherein for a case with the first priority value,
the determining the candidate resource ratio includes determining a first candidate resource ratio from the plurality of candidate resource ratios, and
the identifying the plurality of candidate resources includes multiplying the determined first candidate resource ratio by a total number of candidate resources in the case with the first priority value; and for a case with the second priority value,
the determining the candidate resource ratio includes determining a second candidate resource ratio from the plurality of candidate resource ratios, and
the identifying the plurality of candidate resources includes multiplying the determined second candidate resource ratio by a total number of candidate resources in the case with the second priority value.

10. The integrated circuit of claim 9, wherein the plurality of candidate resources are identified based on the candidate resource ratio and a Reference Signal Received Power (RSRP) threshold.

11. The communication method of claim 5, wherein the plurality of candidate resources are identified based on the candidate resource ratio and a Reference Signal Received Power (RSRP) threshold.

12. The communication apparatus of claim 1, wherein the plurality of candidate resources are identified based on the candidate resource ratio and a Reference Signal Received Power (RSRP) threshold.

13. The communication apparatus of claim 1, wherein,
in the first case, the identifying the plurality of candidate resources comprises comparing a first number of candidate resources with a result of the multiplying of the determined first candidate resource ratio by the total number of candidate resources in the case with the first priority value; and
in the second case, the identifying the plurality of candidate resources comprises comparing a second number of candidate resources with a result of the multiplying of the determined second candidate resource ratio by the total number of candidate resources in the case with the second priority value.

14. The communication method of claim 5, wherein,
in the first case, the identifying the plurality of candidate resources comprises comparing a first number of candidate resources with a result of the multiplying of the determined first candidate resource ratio by the total number of candidate resources in the case with the first priority value; and
in the second case, the identifying the plurality of candidate resources comprises comparing a second number of candidate resources with a result of the multiplying of the determined second candidate resource ratio by the total number of candidate resources in the case with the second priority value.

15. The integrated circuit of claim 9, wherein,
in the first case, the identifying the plurality of candidate resources comprises comparing a first number of candidate resources with a result of the multiplying of the determined first candidate resource ratio by the total number of candidate resources in the case with the first priority value; and
in the second case, the identifying the plurality of candidate resources comprises comparing a second number of candidate resources with a result of the multiplying of the determined second candidate resource ratio by the total number of candidate resources in the case with the second priority value.

\* \* \* \* \*